United States Patent
Kang et al.

(10) Patent No.: US 7,956,544 B2
(45) Date of Patent: Jun. 7, 2011

(54) LIGHT SOURCE MODULE, BACKLIGHT ASSEMBLY HAVING THE SAME, DISPLAY DEVICE HAVING THE SAME AND METHOD FOR REDUCING NUMBER OF WIRES USED IN INTERCONNECT CABLE OF THE SAME

(75) Inventors: Eui-Jeong Kang, Chungcheongham-do (KR); Gi-Cherl Kim, Gyeonggi-do (KR); Se-Ki Park, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 303 days.

(21) Appl. No.: 12/102,684

(22) Filed: Apr. 14, 2008

(65) Prior Publication Data
US 2009/0121652 A1    May 14, 2009

(30) Foreign Application Priority Data
Nov. 8, 2007  (KR) .................. 10-2007-0113456

(51) Int. Cl.
H05B 37/00    (2006.01)
(52) U.S. Cl. ..................... 315/161; 362/97.3
(58) Field of Classification Search .......... 362/97.1, 362/97.2, 97.3; 345/102, 80, 82, 83, 84, 345/87; 315/160, 161, 169.2, 169.3; 349/58, 349/61, 69, 70
See application file for complete search history.

(56) References Cited

U.S. PATENT DOCUMENTS

| | | | | |
|---|---|---|---|---|
| 7,495,397 B2 * | 2/2009 | Okabe | ......... | 315/169.1 |
| 7,541,752 B2 * | 6/2009 | Kunifuda | ......... | 315/312 |
| 7,566,143 B2 * | 7/2009 | Furukawa et al. | ......... | 362/231 |
| 7,573,447 B2 * | 8/2009 | Oh et al. | ......... | 345/87 |
| 7,683,981 B2 * | 3/2010 | Uemoto | ......... | 349/69 |
| 2006/0221592 A1 * | 10/2006 | Nada et al. | ......... | 362/29 |
| 2006/0221612 A1 * | 10/2006 | Song et al. | ......... | 362/247 |
| 2008/0030645 A1 * | 2/2008 | Nam et al. | ......... | 349/61 |

FOREIGN PATENT DOCUMENTS

| | | |
|---|---|---|
| JP | 2006-285181 | 10/2006 |
| KR | 2006-0014575 | 2/2006 |
| KR | 2006-038556 | 5/2006 |

* cited by examiner

*Primary Examiner* — Thuy Vinh Tran
(74) *Attorney, Agent, or Firm* — Innovation Counsel LLP

(57) ABSTRACT

A light source module includes a driving substrate, a plurality of light source blocks and a currents control element. The light source blocks are disposed on the driving substrate, and each of the light source blocks includes at least one light source. The currents control element is disposed on the driving substrate, and has channel terminals for individually controlling driving currents passed through at least two light source blocks. The channel terminals are electrically connected to the at least two light source blocks, respectively. The currents control element is disposed on the driving substrate and individually controls the driving currents applied to the light source blocks, so that a number of wires of a connection cable connected to a light source driving connector is less than the number of light source drive currents being individually controlled.

30 Claims, 11 Drawing Sheets

US 7,956,544 B2

LIGHT SOURCE MODULE, BACKLIGHT ASSEMBLY HAVING THE SAME, DISPLAY DEVICE HAVING THE SAME AND METHOD FOR REDUCING NUMBER OF WIRES USED IN INTERCONNECT CABLE OF THE SAME

CROSS-REFERENCE TO RELATED APPLICATION

This application claims priority under 35 USC §119 to Korean Patent Application No. 2007-113456, filed on Nov. 8, 2007 in the Korean Intellectual Property Office (KIPO), the disclosure of which is herein incorporated by reference in its entirety.

BACKGROUND

1. Field of Invention

The present disclosure of invention relates to a light source module, a backlight assembly having the light source module and a display device having the backlight assembly. More particularly, the present disclosure relates to interconnect cabling and disconnectable interconnect pins used in a light source module capable of providing a display panel with light, a backlight assembly having the light source module and a display device having the backlight assembly.

2. Description of Related Technology

A liquid crystal display (LCD) device can offer various advantages such as small thickness, light weight, low power consumption, etc. Therefore, the liquid crystal display device is used as a display means in various fields such as computer monitors, notebook computer displays, cellular phone displays, big screen television receiver set displays, etc. The typical liquid crystal display device includes a liquid crystal display panel displaying an image by using selective light transmittance through a liquid crystal layer and a backlight assembly disposed under the liquid crystal display panel to provide the liquid crystal display panel with light.

The typical backlight assembly includes a light source that generates light. The light source may be a cold cathode fluorescent lamp, a hot cathode fluorescent lamp, a light emitting diode, etc. Among these, the light emitting diode (LED) offers various advantages such as low power consumption and high color reproducibility, and thus is widely used as the light source. However, current flow through the LED has to be controlled so as to produce desired intensity of light in changing environments such as changing temperature, changing mass production conditions, etc.

Recently, the size of the liquid crystal display devices has increased, and thus the size of the backlight assembly also needs to increase. Accordingly, the number of light source blocks used in the backlight assembly gradually increases with time and the number of electrical current flows that may need to be individually controlled increases. When the number of the light source blocks increases, the number of connection cables for individually connecting to and controlling the current flows of the light source blocks tends to increase and the number of disconnectable pins of connectors electrically connected to the connection cables tends to increase.

When the number of the connection cables or wires therein increases, costs of the connection cables may increase. When the number of the disconnectable pins of the connectors increases, danger of a contact defect occurring in an electrical contact region between the connection cable and the connector increases. As a result the operability of the backlight assembly tends to become less reliable as the number of disconnectable pins increases.

SUMMARY

In accordance with an aspect of the present disclosure, there is provided a light source module including a driving substrate, a plurality of light source blocks and a currents control element.

The light source blocks are disposed on a first side of the driving substrate, and each of the light source blocks includes at least one light source, but more typically plural light sources whose current flows may need to be individually controlled. The currents control element is disposed on the first side of the driving substrate, and has channel terminals for individually controlling respective driving currents passed through at least two respective ones of the light source blocks. The channel terminals are electrically connected to the at least two light source blocks, respectively.

In one embodiment, the light source module may further include a light source driving connector electrically connected to the driving substrate. The light source driving connector may be disposed on the first side of the driving substrate or on a second side of the driving substrate opposite to the first side of the driving substrate.

The light source driving connector may include a first connector output terminal electrically connected to each first terminal of the light source blocks and a second connector output terminal electrically connected to an input terminal of the currents control element. The channel terminals of the currents control element may be electrically connected to respective second terminals of the light source blocks.

In accordance with another aspect of the present disclosure, there is provided a backlight assembly including at least one light source module and a light source control unit.

The light source module includes a driving substrate, a plurality of light source blocks and a currents control element. The light source blocks are disposed on a first side of the driving substrate, and each of the light source blocks includes at least one light source. The currents control element has channel terminals for individually controlling driving currents applied to at least two light source blocks. The channel terminals are electrically connected to the at least two light source blocks, respectively.

The light source control unit is electrically connected to the light source module. The light source control unit includes at least one voltage transforming circuit that transforms a source voltage applied from an exterior into one or more driving voltages for driving the light source blocks.

In another embodiment, the light source module may further include a light source driving connector electrically connected to the driving substrate. The light source driving connector may electrically connect the light source control unit to the light source module.

The light source driving connector may include a connector input terminal electrically connected to the light source control unit, and a connector output terminal electrically connected to the light source blocks and the currents control element. The connector output terminal may include a first connector output terminal electrically connected to each first terminal of the light source blocks to output the driving voltage, and a second connector output terminal electrically connected to an input terminal of the currents control element to output one or more control signals for controlling the currents control element. The channel terminals of the currents control element may be electrically connected to second terminals of the light source blocks, respectively, to individually control the driving currents.

The backlight assembly may further include a receiving container including a bottom plate and a side wall connected to an edge of the bottom plate. The receiving container may receive the light source module and expose the light source blocks and the currents control element to an exterior.

The light source driving connector may be disposed on the first side of the driving substrate. The backlight assembly may further include a side mold disposed at an end portion of the first side of the driving substrate. The side mold may cover the currents control element. The light source driving connector may be disposed at the end portion of the first side of the driving substrate, and the side mold may cover the light source driving connector. The side wall of the receiving container may include a connector linking hole facing the light source driving connector. The backlight assembly may further include a connection cable electrically connecting the light source control unit to the light source control connector through the connector linking hole.

In another embodiment, the light source driving connector may be disposed on a second side of the driving substrate facing the bottom plate of the receiving container. The bottom plate of the receiving container may include a connector receiving hole for receiving the light source driving connector. The backlight assembly may further include a connection cable electrically connecting the light source control unit to the light source driving connector.

In another embodiment, the light source driving connector may protrude downwardly from the bottom plate of the receiving container through the connector receiving hole. The light source control unit may be slidingly inserted into the portion of the light source driving connector protruding down from the bottom plate to be electrically connected to the light source driving connector.

In another embodiment, the light source control unit may include a power supply substrate having the voltage transforming circuit and providing the light source module with one or more predetermined driving voltages, and a control logic substrate providing the light source module with one or more control signals for controlling the currents control element.

In another embodiment, the voltage transforming circuit may include an inductor receiving the source voltage, a transistor electrically connected to the second terminal of the inductor, a voltage transforming control element electrically connected to the transistor, a diode electrically connected to the inductor, and a capacitor electrically connected to the diode and the voltage transforming element.

In another embodiment, each of the light source blocks may include a plurality of light emitting diodes electrically connected to each other as series strings. Alternatively, each of the light source blocks may include a plurality of red light emitting diodes (r-LEDs) electrically connected to each other as a first series string, a plurality of green light emitting diodes (g-LEDs) electrically connected to each other as a second series string, and a plurality of blue light emitting diodes (b-LEDs) electrically connected to each other as a third series string.

In accordance with still another aspect of the present disclosure, there is provided a display device including a display panel and a backlight assembly disposed under the display panel. The backlight assembly provides the display panel with a light.

The backlight assembly includes at least one light source module and a light source control unit. The light source module includes a driving substrate, a plurality of light source blocks and a currents control element. The light source blocks are disposed on a first side of the driving substrate, and each of the light source blocks includes at least one light source. The currents control element has channel terminals for individually controlling respective driving currents applied respectively through at least two light source blocks. The channel terminals are electrically connected to the at least two light source blocks, respectively. The light source control unit is electrically connected to the light source module. The light source control unit includes at least one voltage transforming circuit that transforms a source voltage applied from an exterior into one or more predetermined driving voltages for driving the light source blocks.

In one embodiment, the light source control unit may include a power supply substrate having the voltage transforming circuit and providing the light source module with the one or more driving voltages, and a control logic substrate providing the light source module with one or more control signals for controlling the currents control element.

According to the present disclosure, the currents control element is disposed on a light-sources supporting substrate and individually controls driving currents applied to light source blocks, so that the number of wires of a connection cable connected to a light source driving connector of a light source module and the number of pins of the light source driving connector may be reduced. Accordingly, the cost of the connection cable may be reduced, and the risk of a contact defect occurring between the connection cable and the light source driving connector may be prevented.

BRIEF DESCRIPTION OF THE DRAWINGS

The above and other features and advantages of the present disclosure will become more apparent by describing in detailed embodiments thereof with reference to the accompanying drawings, in which.

DETAILED DESCRIPTION

Figure 1:
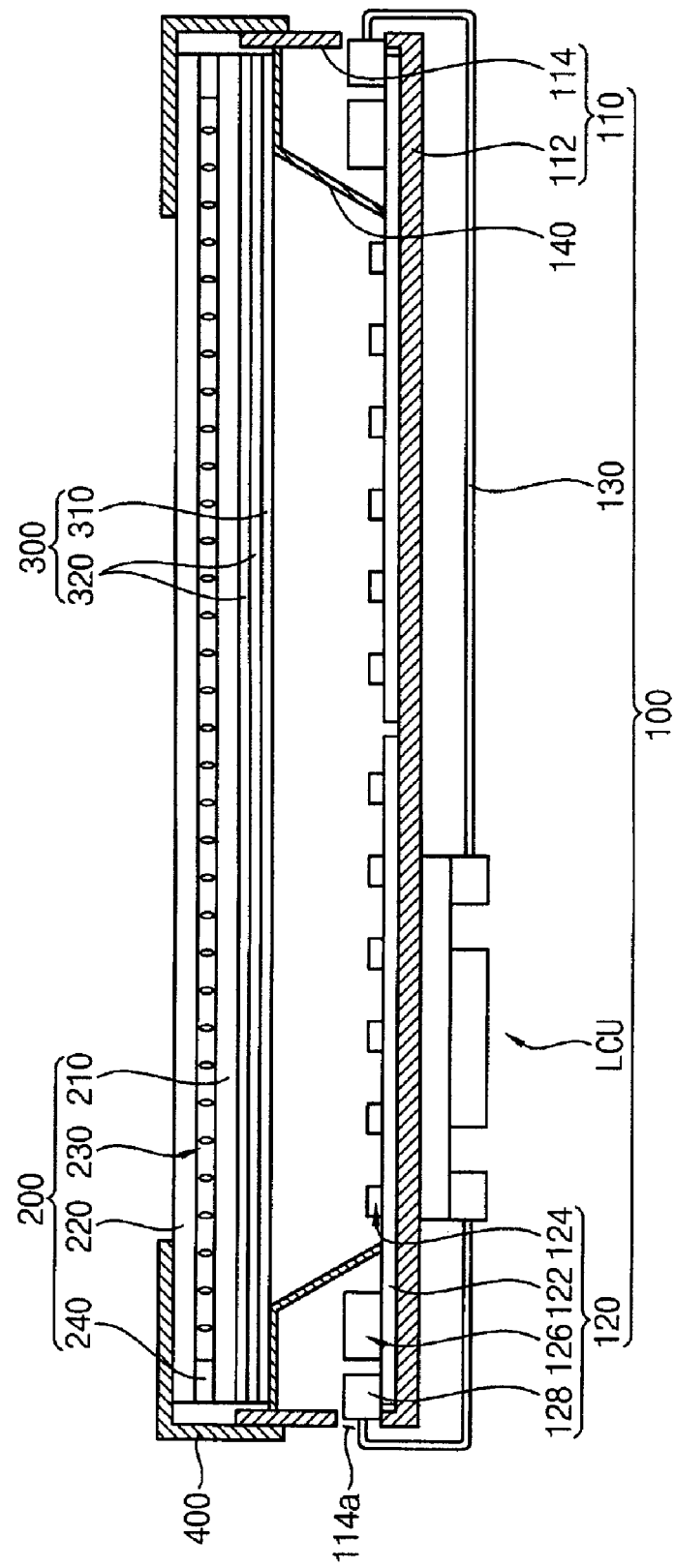
FIG. 1 is a cross-sectional view illustrating a display device in accordance with one embodiment.

The present disclosure of invention is described more fully hereinafter with reference to the accompanying drawings, in which various embodiments are shown for purpose of illustration. The teachings of the present disclosure may, however, be embodied in many different other forms and should not be construed as limited to the embodiments set forth herein. Rather, these embodiments are provided so as to convey exemplary illustrations of the present disclosure to those skilled in the pertinent art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like reference numerals generally refer where practical to like although not necessarily identical elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments described herein are with reference to cross-section illustrations that are schematic illustrations of idealized embodiments (and intermediate structures) of the present invention. As such, variations from the shapes of the illustrations as a result, for example, of manufacturing techniques and/or tolerances, are to be expected. Thus, the exemplary embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present disclosure.

Unless otherwise defined, all terms (including technical and scientific terms) used herein have the same meaning as commonly understood by one of ordinary skill in the pertinent art to which the present disclosure applies. It will be further understood that terms, such as those defined in commonly used dictionaries, should be interpreted as having a meaning that is consistent with their meaning to ordinarily skilled artisans in the context of the relevant art and will not be interpreted in an idealized or overly formal sense unless expressly so defined herein.

FIG. 1 is a cross-sectional view illustrating a display device in accordance with one embodiment.

Referring to FIG. 1, a display device includes a backlight assembly 100, a display panel 200, an optical member 300 and a top chassis 400.

The backlight assembly 100 generates light and provides the display panel 200 with the light.

The display panel 200 is disposed over the backlight assembly 100. The display panel 200 displays an image by using, at least some times, the light generated from the backlight assembly 100.

The display panel 200 may include, for example, a first substrate 210, a second substrate 220, a liquid crystal layer 230 and a seal line or ring 240.

The first substrate 210 is disposed over the backlight assembly 100. The first substrate 210 may include a plurality of pixel electrodes (not illustrated) and a plurality of thin film transistors (TFT's, not illustrated) electrically connected to the pixel electrodes for selectively controlling electric fields generated by the pixel-electrodes.

The second substrate 220 faces the first substrate 210. The second substrate 220 may include a plurality of color filters (not illustrated) corresponding to the pixel electrodes and a common electrode formed across substantially the whole surface of the second substrate 220.

The liquid crystal layer 230 is interposed between the first and second substrates 210 and 220. Liquid crystal molecules in the liquid crystal layer 230 are rearranged by electric fields formed between the pixel electrodes and the common electrode. Accordingly, light transmittance by the liquid crystal layer 230 is changed by changing the electric potentials of the pixel-electrodes and corresponding images are formed.

The seal line 240 is disposed between the first and second substrates 210 and 220 to combine the first and second substrates 210 and 220. The seal line (or ring) 240 seals the liquid crystal layer 230 so that the liquid crystal molecules are not leaked from the display panel 200.

The optical member 300 is disposed between the backlight assembly 100 and the display panel 200. The optical member 300 improves optical characteristics of the light generated in the backlight assembly 100. For example, the optical member 300 may include a diffusing plate 310 for diffusing the light generated from the backlight assembly 100 and at least one prism sheet 320 for improving a brightness characteristic of the light.

The top chassis 400 is disposed over the display panel 200, and fixes the display panel 200 to the backlight assembly 100.

Figure 2:
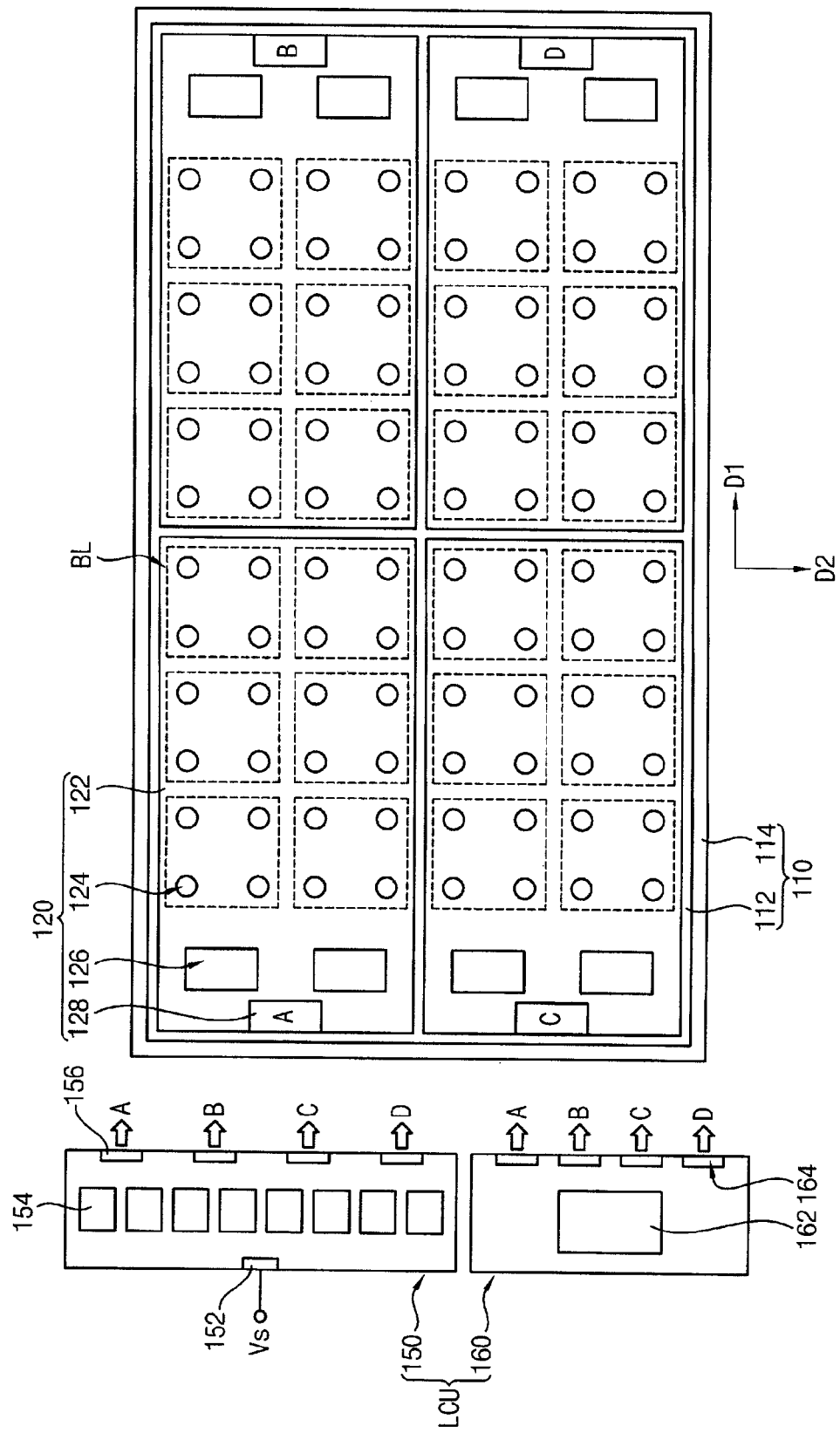
FIG. 2 is a plan view illustrating a backlight assembly of the display device illustrated in FIG. 1.

FIG. 2 is a plan view illustrating a backlight assembly of the display device illustrated in FIG. 1. Referring to FIGS. 1 and 2, the backlight assembly 100 may include a receiving container 110, at least one light source module 120, a light source control unit LCU, one or more connection cables 130 and a side mold 140.

The receiving container 110 includes a bottom plate 112 having a platelike shape and at least one side wall 114 connected to an edge of the bottom plate 112. The bottom plate 112 may have a substantially rectangular shape, and the side wall 114 may be formed at each of four sides of the bottom plate 112 so as to define for example, a tray. For example, a length of a horizontal side of the bottom plate 112 in a first direction D1 may be longer than a length of a vertical side of the bottom plate 112 in a second direction D2 substantially perpendicular to the first direction D1.

The light source module 120 is received in the receiving container 110. For example, the number of the light source modules 120 is four, and the four light source modules 120 may be arranged adjacent to each other in two columns and two rows in the receiving container 110.

Each light source module 120 may include a driving substrate 122, a plurality of light source blocks BL, at least one currents control element 126 and a light source driving connector 128.

The driving substrate 122 may be a printed circuit board (PCB) having lines for transmitting control signals, power signals and ground return signals. For example, the driving substrate 122 may be a single layer PCB in which the transmitting lines are formed at only one side thereof, or a two layer PCB in which the transmitting lines are formed at both sides thereof. Further, the driving substrate 122 may be a multilayer PCB in which the transmitting lines are formed in a plurality of conductive and patterned layers that are insulatively spaced apart from one another.

The driving substrate 122 may have a substantially rectangular shape. For example, a length of a horizontal side of the driving substrate 122 in the first direction D1 may be longer than a length of a vertical side of the driving substrate 122 in the second direction D2.

The light source blocks BL are disposed on a first side of the driving substrate 122 facing the optical member 300. The light source blocks BL are electrically connected to the lines of the driving substrate 122. The light source blocks BL may be disposed in a matrix shape along the first and second directions D1 and D2 on the first side of the driving substrate 122. For example, the number of the light source blocks BL is six, and the six light source blocks BL may be arranged in three columns and two rows.

Each of the light source blocks BL may include at least one light source 124. For example, if the number of the light sources 124 is four, the four light sources 124 may be arranged in two columns and two rows along the first and second directions D1 and D2. Each light source 124 may include one or more light emitting diodes (hereinafter, LEDs) that emit a light by receiving a respective drive current from the lines of the driving substrate 122. For example, the light source 124 may be a white light emitting diode or a combination of primary-color LEDs whose combined output appears as a substantially white light emission. In the case where a combination of differently colored LEDs (e.g., R, G, B) are used to produce the perception of a white light, the differently colored LEDs may call for different drive currents, different drive voltages and/or different variations of their respective drive currents and drive voltages in the face of changing environmental conditions (e.g., changing temperature).

The currents control element 126 may be disposed on the first side of the driving substrate 122. The currents control element 126 is electrically connected to each of the light source blocks BL through the lines of the driving substrate 122. The currents control element 126 may be disposed at an end portion of the first side of the driving substrate 122. For example, the currents control element 126 may be disposed facing the side wall 114 in the first direction D1. In one embodiment, the currents control element 126 includes a monolithic integrated circuit such as a semiconductor chip and operations of the currents control element 126 are controllable by serial control signals that are supplied to the currents control element 126 on a synchronous or asynchronous basis. In one embodiment, a field programmable logic means (e.g., an FPGA) determines what control signals will be serially delivered to the currents control element 126.

The currents control element 126 may individually control respective ones of plural driving currents applied to the light source blocks BL. For example, if the currents control element 126 comprises two currents control subelements, and the two currents control subelements 126 may be referenced as a first currents control subelement 126a and a second currents control subelement 126b. The first currents control subelement 126a may control a plurality of currents passed through the light source blocks BL disposed in a first row, and the second currents control subelement 126b may control a plurality of currents passed through the light source blocks BL disposed in a second row. Control of the respective ones of plural driving currents by the currents control element 126 may take any of various forms for controlling electrical power delivered to the corresponding light sources. In one embodiment, such current control includes varying a magnitude of the passed current either in a continuous analog fashion or in a digital discrete steps fashion. In a same or alternate embodiment, such current control includes varying a duty cycle of current pulses delivered to the corresponding light sources. Those skilled in the art will appreciate that the amount of power delivered to the light sources is function of voltage applied across each light source and the amount of current per unit time passed through the light source. Some light sources such as LEDs may be driven with voltages of a limited range due to forward biasing physics of the semiconductor devices. In such cases, apparent intensity of emitted light is usually controlled by varying the magnitude of current passed through the light source and/or the duty cycle of current pulses if the current is pulsed (typically at a frequency higher than can be detected by human eye).

The light source driving connector 128 may be disposed at an end portion of the first side of the driving substrate 122. For example, the light source driving connector 128 may be disposed adjacent to the first and second currents control subelements 126a and 126b, or may be disposed at the outmost edge of the driving substrate 122 in the first direction D1.

The light source driving connector 128 may include one or more connector input terminals and one or more connector output terminals. The connector input terminal(s) is/are to be electrically connected to a connection cable. The connector output terminal(s) is/are to be electrically connected to the light source blocks BL and the currents control element 126. In one embodiment, the connector output terminals include a first connector output terminal electrically connected to each terminal of the light source blocks BL and a second connector output terminal electrically connected to an input terminal of the currents control element 126.

The side wall 114 of the receiving container 110 may include a connector linking hole 114a (FIG. 1) facing the light source driving connector 128. A portion of the light source driving connector 128 may be received in the connector linking hole 114*a*. Alternatively, the light source driving connector 128 may not be received in the connector linking hole 114*a*.

The light source control unit LCU is electrically connected to the driving substrate 122 to provide the driving substrate 122 with driving voltages and/or drive control signals. The light source control unit LCU may control the currents control element 126 and the light source blocks BL by selectively varying one or more of the supplied driving voltage and the supplied control signals. The light source control unit LCU may be disposed under a lower part of the backlight assembly 100. That is, the light source control unit LCU may be disposed on an external surface of the bottom plate 112 of the receiving container 110. In one embodiment, the LCU 160 includes a monolithic integrated circuit such as a semiconductor chip and operations of the LCU are controllable by operation instructing signals such as software signals that are programmably loaded into a field programmable logic means (e.g., an FPGA) included in the LCU 160.

The connection cable(s) 130 electrically connect the light source control unit LCU to the driving substrate 122. The connection cable(s) 130 is/are electrically connected to respective light source driving connector(s) 128 via respective connector linking hole(s) 114*a* formed through the side wall 114.

The side mold 140 is received in the receiving container 110, and is disposed facing the side wall 114. The side mold 140 is disposed at an end portion of the first side of the driving substrate 122 to cover the currents control element 126 and the light source driving connector(s) 128. For example, a cross section of the side mold 140 may be bent at least once by an obtuse angle (i.e., exceeding a 90 degree angle). The optical member 300 may be disposed at an upper surface of the side mold 140.

Figure 3:
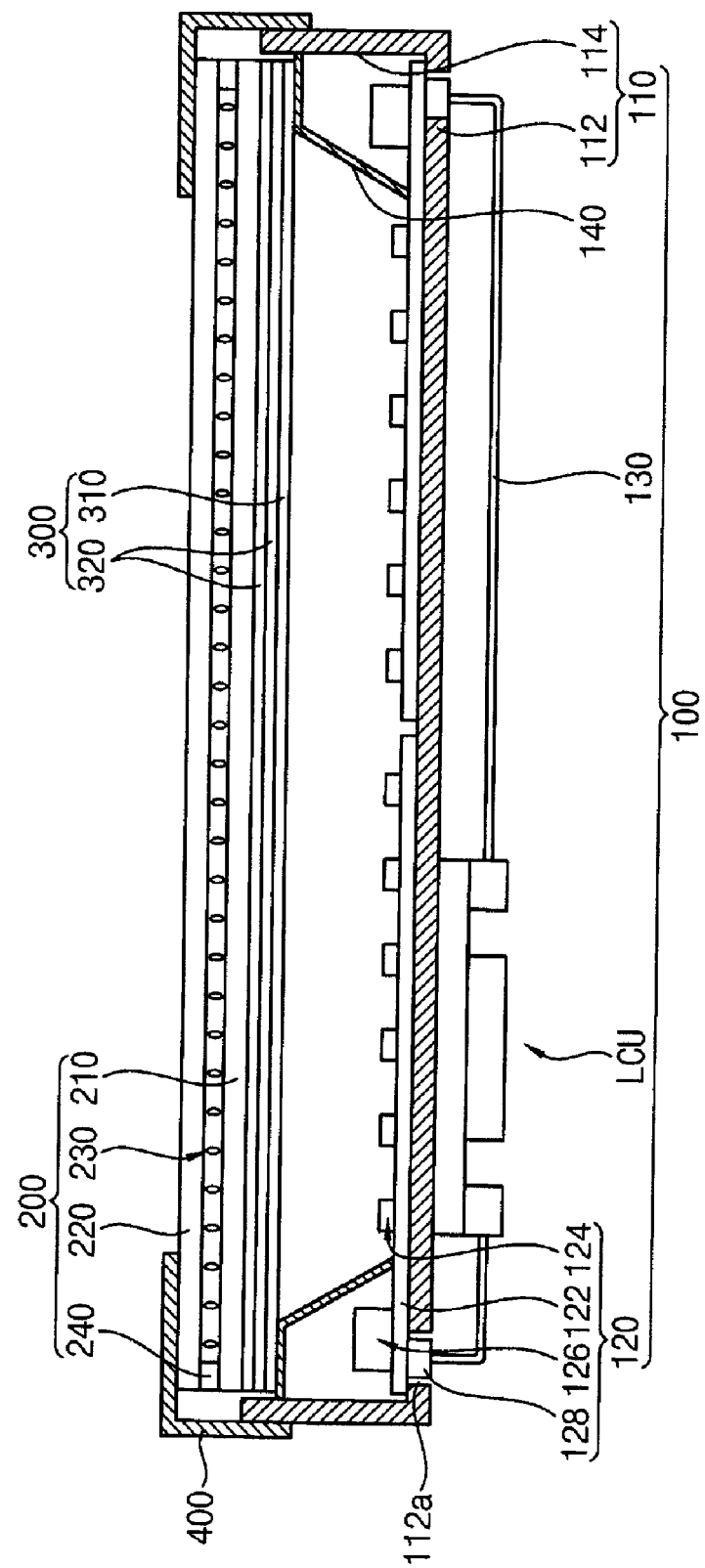
FIG. 3 is a cross-sectional view illustrating a display device in accordance with a second embodiment.

FIG. 3 is a cross-sectional view illustrating a display device in accordance with a second embodiment.

The display device illustrated in FIG. 3 may have substantially the same structure as the display device described with reference to FIGS. 1 and 2 except for positioning(s) of its light source driving connector(s). Thus, the same reference number is used for the same or similar element, and any further descriptions concerning the same or similar elements as those described in FIGS. 1 and 2 will be omitted.

Referring to FIG. 3, the light source driving connector(s) 128 is/are disposed on the other side (i.e., a second side opposite to the first side) of the driving substrate 122 facing the bottom plate 112, unlike the light source driving connector(s) 128 of FIG. 1. The light source driving connector(s) 128 may be disposed at end portions of the second side of the driving substrate 122 corresponding to the currents control element(s) 126.

The bottom plate 112 of the receiving container 110 may have connector receiving hole(s) 112*a* defined therethrough for receiving the light source driving connector(s) 128. The connection cable(s) 130 may be disconnectably connected with the light source driving connector(s) 128 through the connector receiving hole(s) 112*a*.

When the light source driving connector(s) 128 is/are disposed on the second side of the driving substrate 122 unlike FIG. 1, the length of the driving substrate 122 in the first direction D1 may be shorter than that of the driving substrate 122 in FIG. 1.

Figure 4:
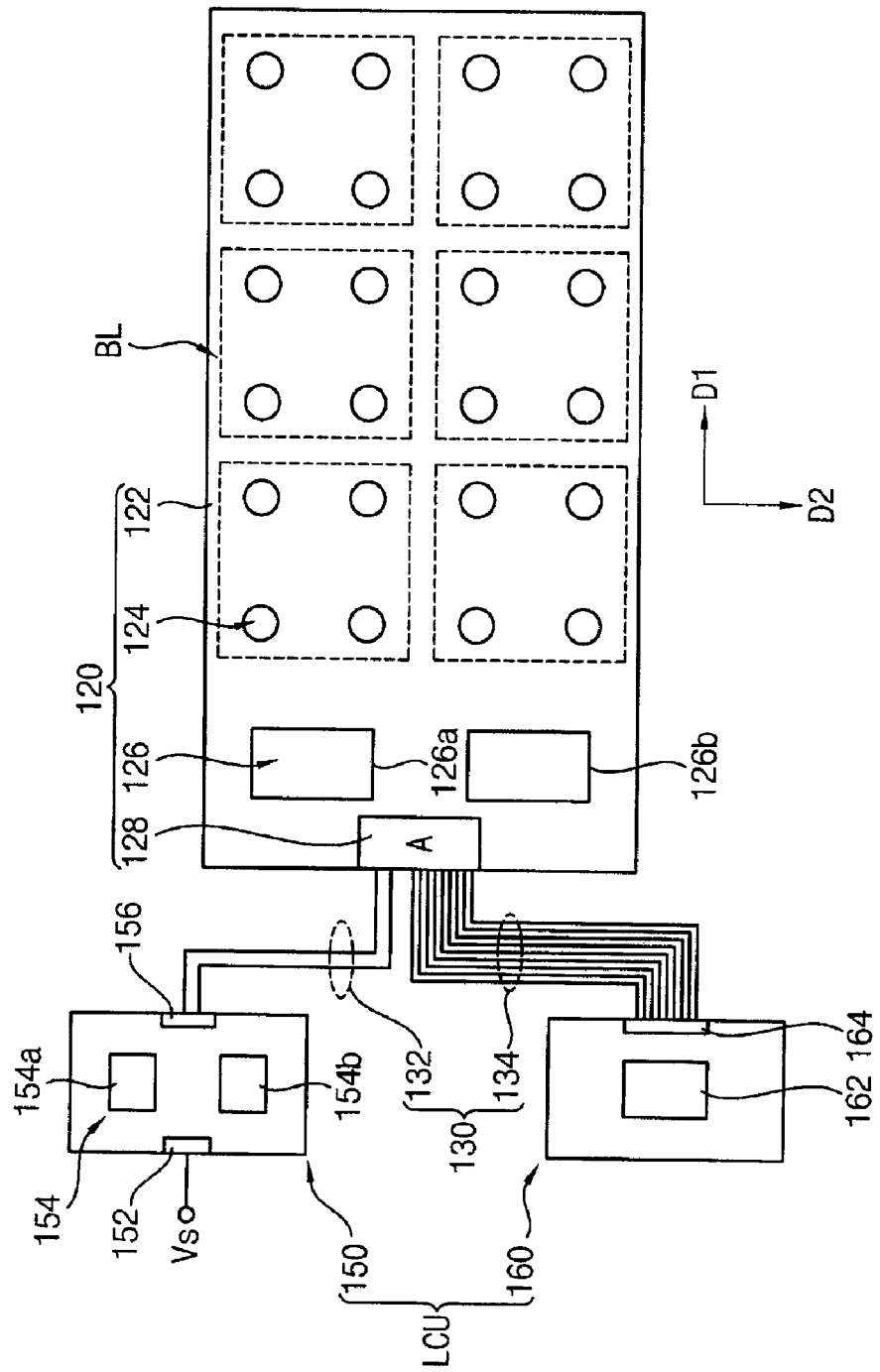
FIG. 4 is a plan view illustrating an electrical connection between the light source module and the light source control unit of the backlight assembly of FIG. 2.

FIG. 4 is a plan schematic view illustrating an electrical connection between the light source module and the light source control unit of the backlight assembly of FIG. 2. In order to avoid clutter, ground lines are not shown but are understood to be present in accordance with conventional electrical design practices. Accordingly, although cable 132 for example shows just two lines for delivering Vd1 and Vd2 (see FIG. 6), it is to be understood that parallel ground return lines may also be present in cable 132.

Referring to FIGS. 2 and 4, the light source control unit LCU may include a power supply substrate (e.g., PCB) 150 and a control logic substrate (e.g., PCB) 160.

The power supply substrate 150 converts a source voltage Vs supplied from an exterior source into one or more predetermined internal driving voltages, and provides the driving substrate 122 of the light source module 120 with the driving voltage(s).

The control logic substrate 160 generates one or more control signals for controlling the currents control element 126 of the light source module 120, and provides the driving substrate 122 of the light source module 120 with the control signal(s).

Each connection cable 130 may include a power supply cable 132 and a control logic cable 134. As already mentioned, ground return lines for power and/or control signals are not shown so as to reduce illustrative clutter. The power supply cable 132 electrically connects the power supply substrate 150 to the driving substrate 122. The control logic cable 134 electrically connects the control logic substrate 160 to the driving substrate 122.

While FIG. 2 illustrates that the power supply substrate 150 is electrically connected to each of four light source modules 120 to provide the driving voltage(s) and that the control logic substrate 160 is electrically connected to each of the four light source modules 120 to provide the control voltage signals, FIG. 4 illustrates that the power supply substrate 150 of that embodiment is electrically connected to one light source module 120 among the four light source modules 120 to provide the driving voltage(s) and that the control logic substrate 160 is electrically connected to one light source module 120 among the four light source modules 120 to provide the control voltage signals. That is, FIG. 4 illustrates FIG. 1 as one light source module 120 to simplify FIG. 1.

Although FIG. 2 and FIG. 4 illustrate the power supply substrate 150 and the control logic substrate 160 separated from each other, the power supply substrate 150 and the control logic substrate 160 may be formed as one contiguous substrate unlike FIGS. 2 and 4.

Figure 5:
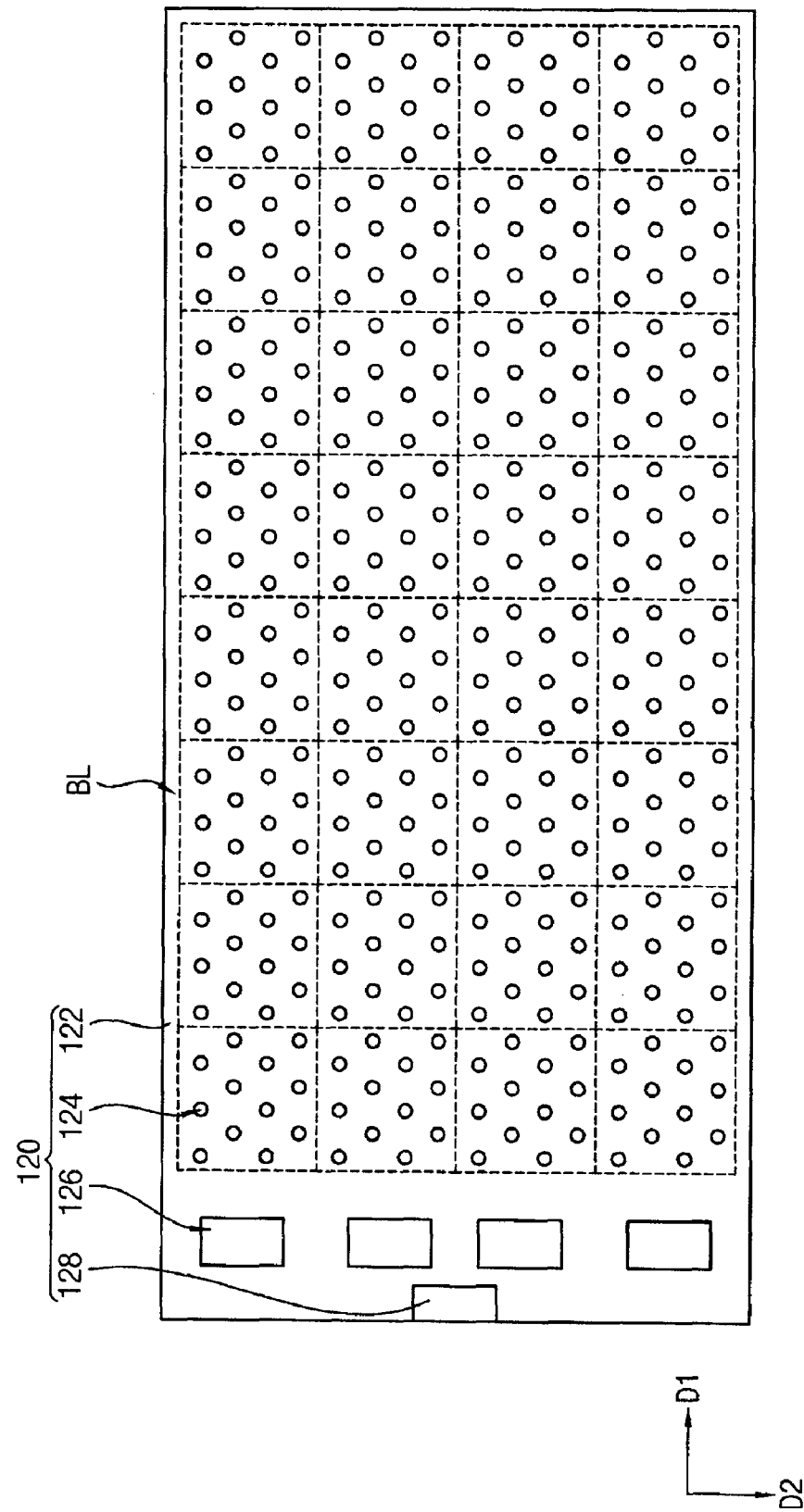
FIG. 5 is a plan view illustrating a light source module in accordance with a third embodiment.

FIG. 5 is a plan view illustrating a light source module in accordance with a third embodiment.

Referring to FIG. 5, the number of light source blocks BL is thirty two unlike FIG. 4, and the thirty two light source blocks BL may be arranged in eight columns and four rows along the first and second directions D1 and D2. In other embodiments, the number and the arrangement of the light source blocks BL are different from those in FIG. 5.

The number of light sources 124 included in each of the light source blocks BL is twelve unlike FIG. 4, and the twelve light sources 124 may be arranged in three columns and four rows. The light sources 124 arranged in an even row may be disposed corresponding to each spatial interval between the light sources 124 arranged in an odd row. In other embodiments, the number and the arrangement of the light sources 124 are different from those in FIG. 5.

In FIG. 5, the number of currents control subelements 126 is four unlike FIG. 4, and the four currents control subelements 126 may be arranged in a line at the end portion of the first side of the driving substrate 122. The four currents control subelements 126 may individually control the light source blocks BL in each row. In other embodiments, the number of the currents control subelements 126 and a correspondent relationship between such currents control subelements 126 and the light source blocks BL are different from those in FIG. 5.

Figure 6:
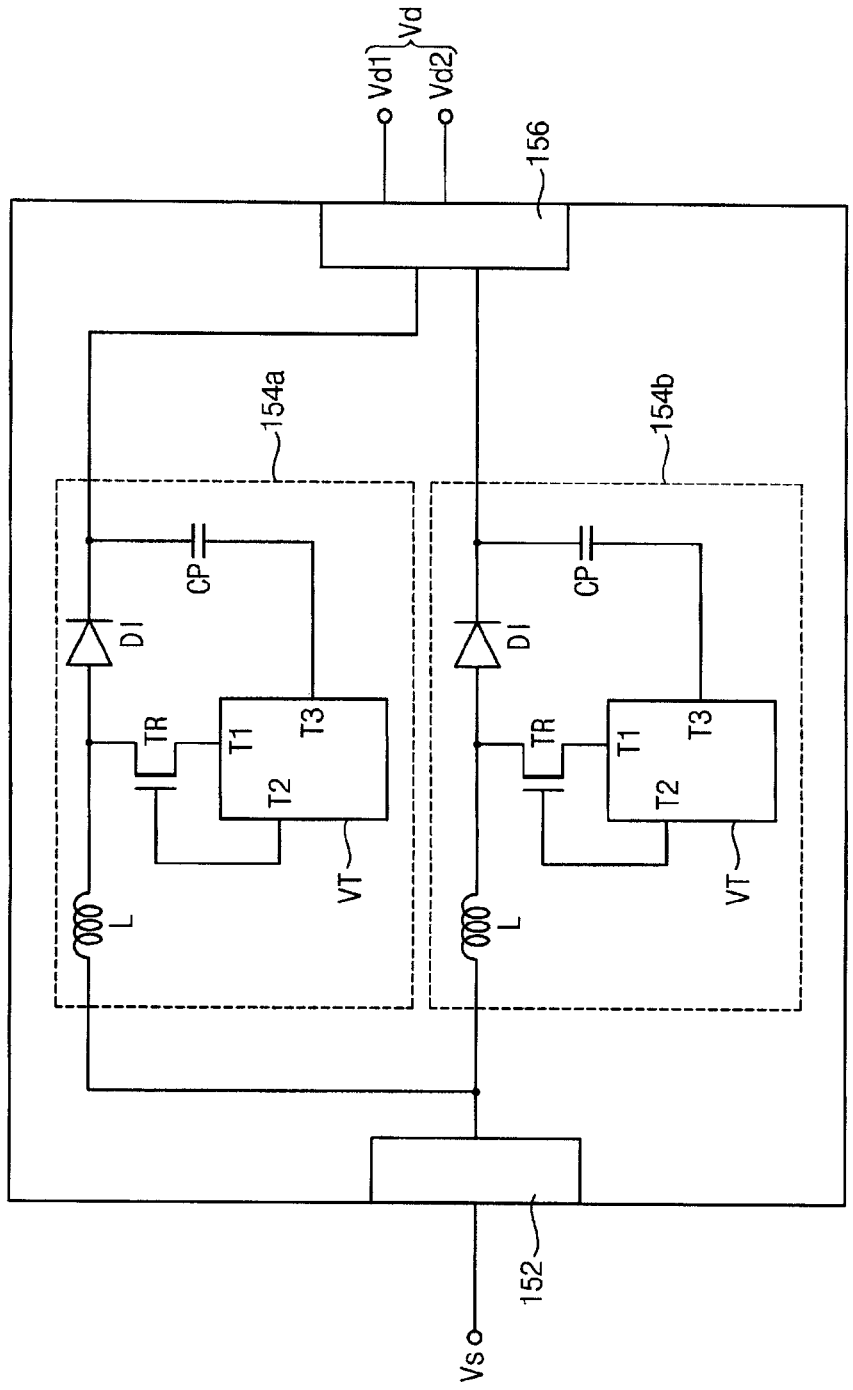
FIG. 6 is a plan view illustrating a power supply substrate of the light source control unit illustrated in FIG. 4.

FIG. 6 is a plan view illustrating a power supply substrate of the light source control unit illustrated in FIG. 4. As mentioned, ground lines are not shown so as to avoid illustrative clutter.

Referring to FIGS. 4 and 6, the power supply substrate 150 may include an input connector 152, at least one voltage transforming circuit 154 (e.g., a switched power circuit) and an output connector 156.

The input connector 152 receives the source voltage Vs from an exterior. The voltage transforming circuit 154 is electrically connected to the input connector 152. The source voltage Vs is applied to the voltage transforming circuit 154. The voltage transforming circuit 154 transforms the source voltage Vs into one or more predetermined driving voltage(s) Vd. The output connector 156 is electrically connected to the voltage transforming circuit 154 to receive the driving voltage(s) Vd. The output connector 156 is electrically connected to the light source driving connector 128 through the power supply cable 132, and outputs the driving voltage(s) Vd to the light source driving connector 128.

The number of the voltage transforming circuits 154 may correspond to the number of the currents control subelements 126. For example, when the number of the currents control subelements 126 is two, the number of the voltage transforming circuits 154 may be two that is the same as the number as that of the currents control subelements 126. That is, the power supply substrate 150 may include two voltage transforming circuits 154 (i.e., a first voltage transforming circuit 154a and a second voltage transforming circuit 154b). The first voltage transforming circuit 154a transforms the source voltage Vs into a first driving voltage Vd1, and the second voltage transforming circuit 154b transforms the source voltage Vs into a second driving voltage Vd2. In an embodiment, the first and second driving voltages Vd1 and Vd2 may be substantially the same. In an alternate embodiment, they may be substantially different from one another and their values may be controlled by the LCU. Although FIG. 6 shows power components (e.g., L of 154b) adjacent to control components (e.g., VT of 154a), it is to be understood that the power supply substrate 150 may be organized in accordance with conventional power supply design rules to isolate control signals from power signals. For example, circuit 154b may be physically flipped so as to be symmetrically disposed relative to circuit 154a with power lines (and ground lines) running on the outside of the PCB and control lines running through the center of the board for example.

The voltage transforming circuit 154 may include voltage boosting circuits that boost the source voltage Vs, and/or it may include voltage reducing circuits that reduce the source voltage Vs. In one embodiment, the source voltage Vs and the driving voltage(s) Vd are direct current (DC) voltages. For example, the voltage transforming circuit 154 may reduce about 120 volts (Vdc) to about 36 Vdc, or may boost about 24 Vdc to about 36 Vdc.

When a voltage transforming subcircuit in circuit 154 is a boosting circuit, the voltage transforming subcircuit (e.g., 154a) may include an inductor L, a transistor TR, a voltage transforming control element VT, a diode DI and a capacitor CP. As understood by those skilled in the switched power art, capacitor CP integrates electrical current output by one or more inductors such as L to produce a desired drive voltage. The voltage transforming control element VT may include feedback control lines (not shown) for monitoring the voltage across capacitor CP and maintaining that drive voltage at the desired magnitude. Moreover, although not shown, it is within the contemplation of the disclosure that the LCU operatively couple to the voltage transforming control element VT so as to control the output voltage and that the LCU be responsive to measurement of ambient temperature conditions so as to thereby control power delivered to the light sources as function of temperature and/or other variable parameters (e.g., light source operating characteristics).

In the illustrated subcircuit 154a, a first terminal of the inductor L is electrically connected to the input connector 152, and a second terminal of the inductor L is electrically connected to an output terminal (e.g., drain) of the transistor TR and a first terminal of the diode DI. An input terminal (e.g., source) of the transistor TR is electrically connected to a first terminal T1 of the voltage transforming control element VT, and a control terminal (e.g., insulated gate) of the transistor TR is electrically connected to a second terminal T2 of the voltage transforming element VT. A second terminal of the diode DI is electrically connected to a first terminal of the capacitor CP and the output connector 156. A second terminal of the capacitor CP is electrically connected to a third terminal T3 (e.g., power ground) of the voltage transforming control element VT. In other embodiments, the voltage transforming circuit 154 may include other elements and have other connections compared to those shown in illustrative FIG. 6.

Figure 7:
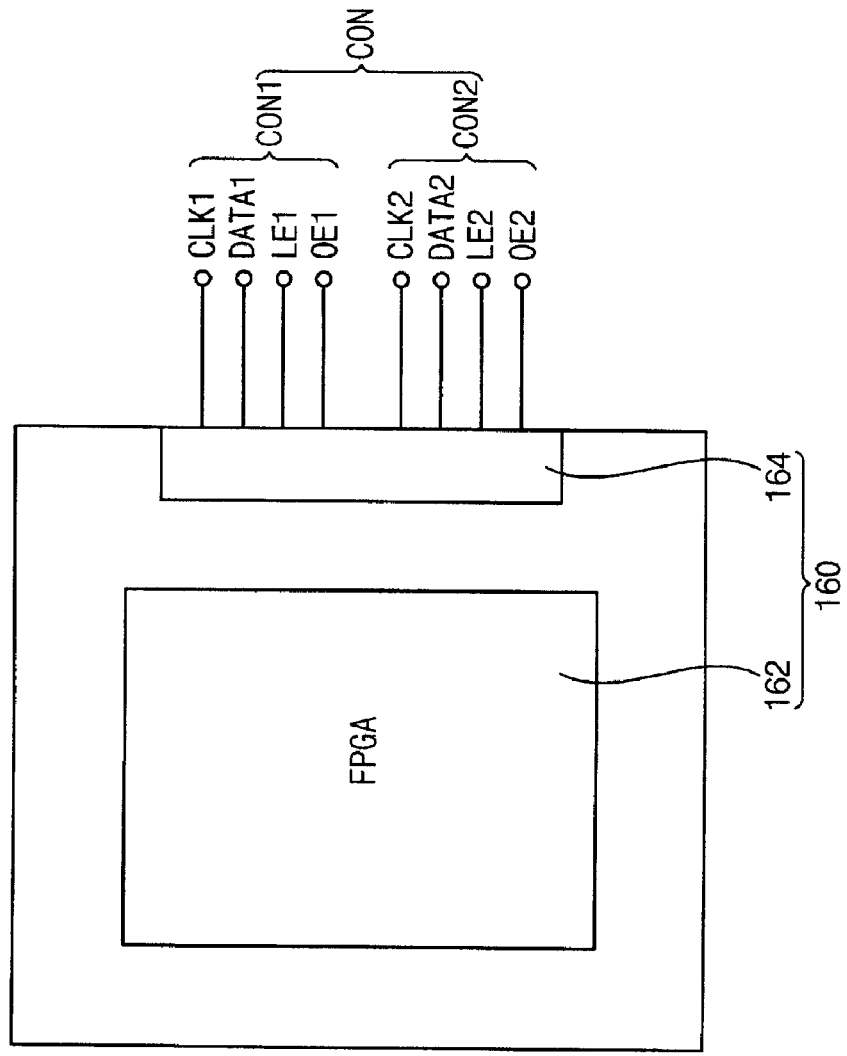
FIG. 7 is a plan view illustrating a control logic substrate of the light source control unit illustrated in FIG. 4.

FIG. 7 is a plan view illustrating a control logic substrate of the light source control unit illustrated in FIG. 4. As indicated, ground lines are not shown.

Referring to FIGS. 4 and 7, the control logic substrate 160 may include a control logic element 162 and a control logic connector 164.

The control logic element 162 generates a plurality of control signals CON for controlling the currents control element 126. The control logic element 162 may output the control signals CON in response to one or more logic control signals applied from an exterior source (not shown). For example, the control logic element 162 may be a field programmable gate array (FPGA).

The control logic connector 164 is electrically connected to the control logic element 162 to receive the control signals CON. The control logic connector 164 is electrically connected to the light source driving connector 128 through the control logic cable 134 to output the control signals CON.

The control signals CON may include a first control signals set CON1 for controlling the first currents control element 126a and a second control signals set CON2 for controlling the second currents control element 126b.

The first control signals set CON1 may include a first clock signal CLK1, a first data signal DATA1, a first latch-enable control signal LE1 and a first output-enable control signal OE1. The second control signals set CON2 may include a second clock signal CLK2, a second data signal DATA2, a second latch-enable control signal LE2 and a second output-enable control signal OE2.

Figure 8:
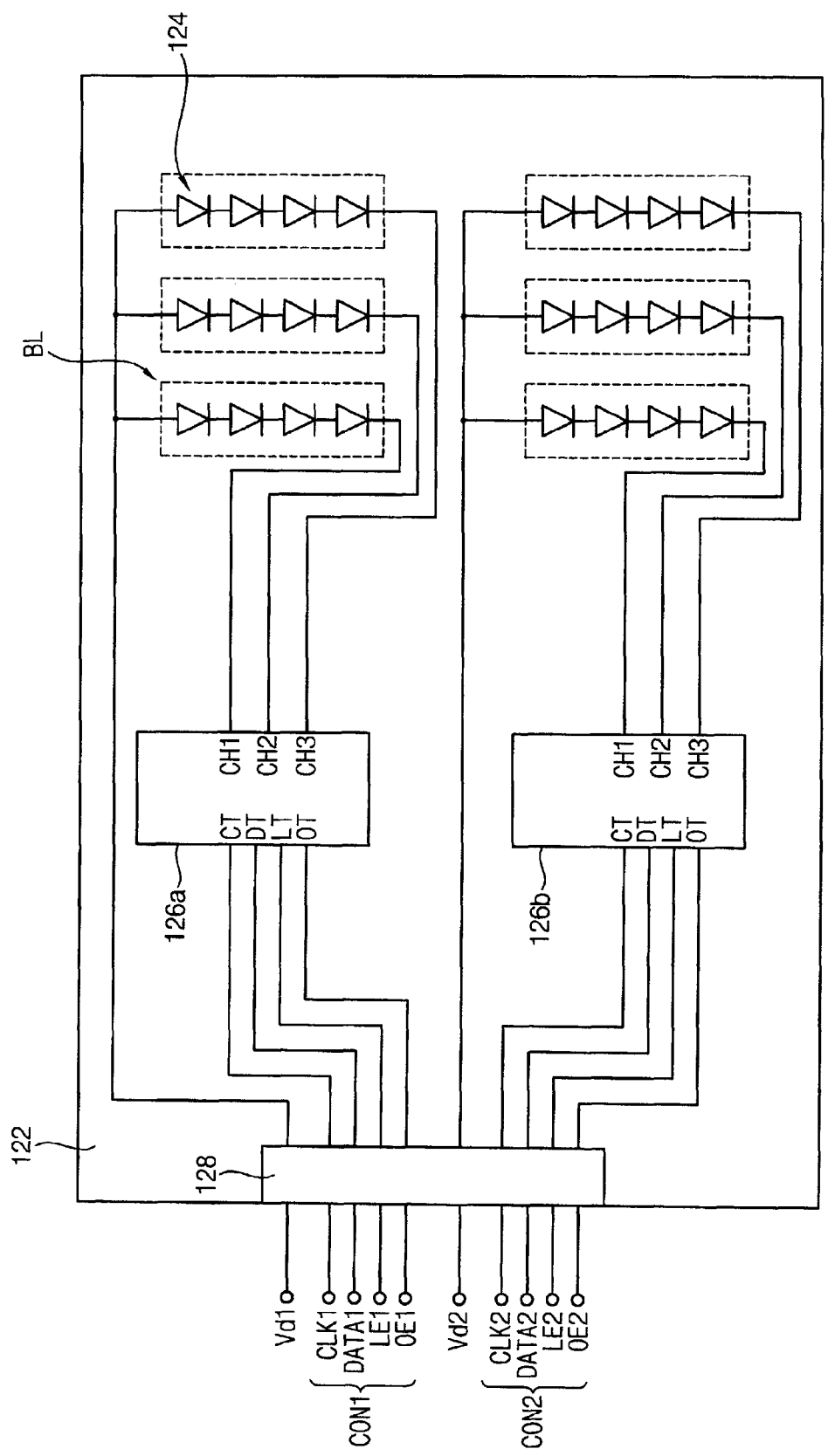
FIG. 8 is a plan view illustrating the light source module of FIG. 4.

FIG. 8 is a plan view schematically illustrating the light source module of FIG. 4. In one embodiment, the lower half is vertically flipped so as to result in a symmetrical disposition with power lines (e.g., Vd1, VD2) on the outside of the board and control lines (e.g., data, clock) running more to the center of the board.

Referring to FIGS. 4 and 8, the first and second driving voltages Vd1 and Vd2 generated in the power supply substrate 150 are applied to the light source driving connector 128 through the power supply cable 132, and the first and second control signal sets CON1 and CON2 generated in the control logic substrate 160 are applied to the light source driving connector 128 through the control logic cable 134.

The light source driving connector 128 is electrically connected to the first currents control subelement 126a to apply the first control signals set CON1, and is electrically connected to the second currents control subelement 126b to apply the second control signals set CON2.

Further, the light source driving connector 128 is electrically connected to each first terminal of the light source blocks BL arranged in the first row to apply thereto the first driving voltage Vd1, and is electrically connected to each first terminal of the light source blocks BL arranged in the second row to apply thereto the second driving voltage Vd2. Here, the light sources 124 (e.g., LEDs) included in each of the light source blocks BL are electrically connected to each other as three series circuits, for example one constituted by red light emitting LEDs, one constituted by green light emitting LEDs and one constituted by blue light emitting LEDs so that the combination of primary colors appears as a white light.

Channel terminals of the first currents control subelements 126a are electrically connected to respective second terminals of the light source blocks BL arranged in the first row, and may individually control the first driving currents applied to the light source blocks BL arranged in the first row. For example, a first channel terminal CH1 of the first currents control element 126a is electrically connected to a second terminal of the light source block BL arranged in the first column and the first row. Further, a second channel terminal CH2 of the first currents control element 126a is electrically connected to a second terminal of the light source block BL arranged in the second column and the first row, and a third channel terminal CH3 of the first currents control element 126a is electrically connected to a second terminal of the light source block BL arranged in the third column and the first row.

Channel terminals of the second currents control elements 126b are electrically connected to respective second terminals of the light source blocks BL arranged in the second row, and may individually control the second driving currents applied to the light source blocks BL arranged in the second row. For example, a first channel terminal CH1 of the second currents control element 126b is electrically connected to a second terminal of the light source block BL arranged in the first column and the second row. Further, a second channel terminal CH2 of the second currents control element 126b is electrically connected to a second terminal of the light source block BL arranged in the second column and the second row, and a third channel terminal CH3 of the second currents control element 126b is electrically connected to a second terminal of the light source block BL arranged in the third column and the second row.

Figure 9:
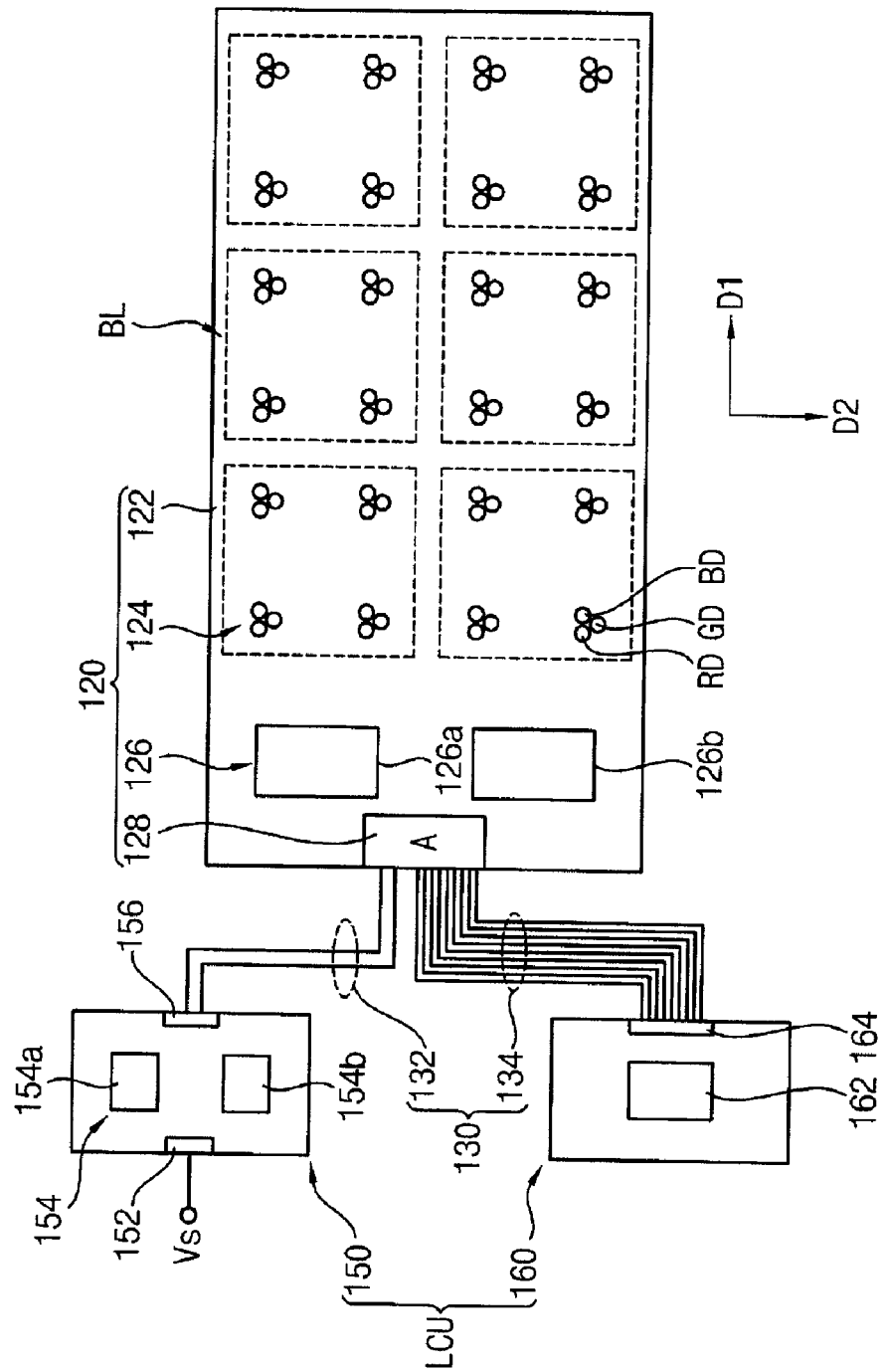
FIG. 9 is a plan view illustrating an electrical connection between a light source module having another light source and a light source control unit of a backlight assembly in accordance with a fourth embodiment.
Figure 10:
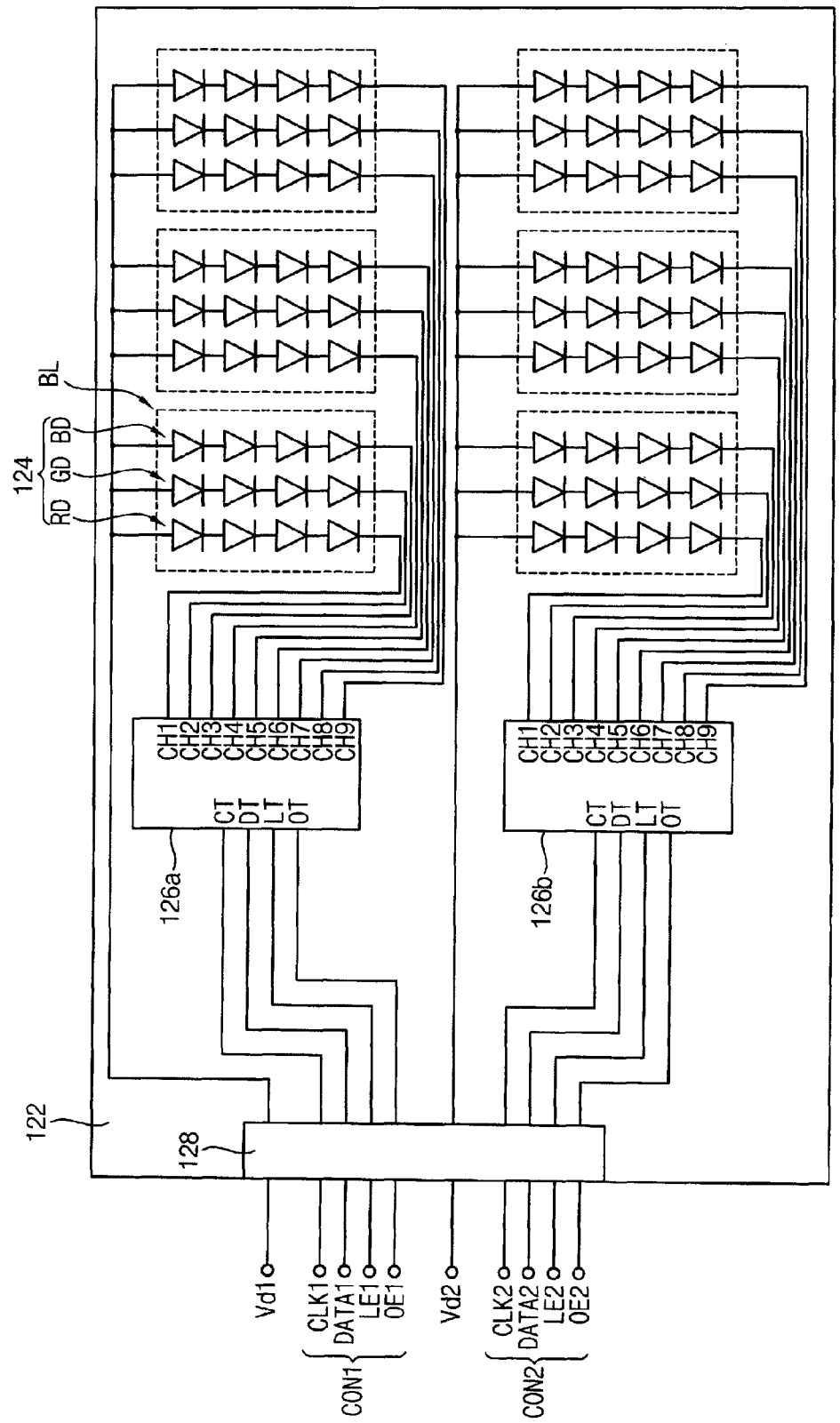
FIG. 10 is a plan view illustrating the light source module of FIG. 9.

FIG. 9 is a plan view illustrating an electrical connection between a light source module having another light source and a light source control unit of a backlight assembly in accordance with further still another embodiment. FIG. 10 is a plan view illustrating the light source module of FIG. 9. Once again, ground lines and other ancillary electrical structures are not shown so as to avoid illustrative clutter.

The backlight assembly illustrated in FIGS. 9 and 10 may have substantially the same structure as the backlight assembly described with reference to FIGS. 4 and 8 except for a kind of a light source and a structure of a light source module. Thus, the same reference number is used for the same or similar element, and any further descriptions concerning the same or similar elements as those described in FIGS. 4 and 8 will be omitted here.

Referring to FIGS. 9 and 10, each of light source blocks BL includes at least one light source 124. The light source 124 may include one or more red light emitting diodes RD, one or more green light emitting diodes GD and one or more blue light emitting diodes BD.

For example, the number of RGB light sources 124 included in each of the light source blocks BL of FIG. 9 is four, and the four RGB light sources 124 may be arranged in two columns and two rows along the first and second directions D1 and D2. In other embodiments, the number of the white light sources 124 and an arranging relationship of the light sources 124 are different from those in FIG. 9.

In one specific embodiment, the red light emitting diodes RD included in each of the light source blocks BL are electrically connected to each other in series to form a red light emitting string. Similarly, the green light emitting diodes GD included in each of the light source blocks BL are electrically connected to each other in series to form a green light emitting string, and the blue light emitting diodes BD included in each of the light source blocks BL are electrically connected to each other in series to form a blue light emitting string.

The first and second currents control subelements 126a and 126b may individually control each of the red, green and blue light emitting strings that are included in one light source block BL. For example, each of the first and second currents control subelements 126a and 126b may include nine channel terminals for independently controlling nine corresponding LED strings. Note in FIG. 9 that there are 6×3=18 strings and that two 9-channel subelements 126a and 126b may therefore independently control each of the 18 LED series strings to produce a desired balance of R, G and B light intensities as well as a desired combine intensity of white light.

According to the above-described embodiments it may be seen that the currents controlling element 126 is disposed on the driving substrate 122 as opposed to being disposed on the power supply substrate 150. As a result, the number of wires of the connection cable 130 connected to the light source driving connector 128 and the number of pins of the light source driving connector 128 may be substantially smaller than the number of lines needed for independently driving the LED current strings. For example in FIG. 10, connector 128 has just 10 non-ground pins as compared to the 18+2=20 non-ground lines needed for driving the 18 series strings of LEDs (or other light sources). Since the number of non-ground pins in connector 128 are substantially reduced, the probability that one out of N pins in connector 128 will fail to make proper contact is similarly reduced. The reliability of the overall circuit is thus enhanced and costs for cabling are simultaneously reduced.

More specifically, when the currents control element 126 is disposed on the light sources supporting board rather than off of it, for example on the power supply substrate 150, then the connection cable 130 between the LCU (see FIG. 1) and the light sources supporting board (e.g., 122 of FIG. 1) does not need to contain as many independent lines as there are independent current strings in need of independent control. That is, the number of the wires of the connection cable 130 do not need to be increased as the number of the channel terminals of the currents control element 126 increases.

Another way of looking at this is to understand that when the currents control element 126 is disposed on the driving substrate 122 rather than on the other side of interconnect cable 130 such as rather than on the power supply substrate 150, the plurality of wires for electrically connecting the channel terminals of the currents control element 126 to the light source blocks BL, respectively, may be removed from the interconnect cable 130. Accordingly, the number of the wires of the connection cable 130 and the number of the pins of the light source driving connector 128 may be seen as being reduced by this amount. The number of wires in interconnect cable 130 is at the same time increased by those wires used to transmit serial control data to the currents control element 126. However, the latter number of added wires can be quite small compared to the number of channel terminal wires eliminated.

When the number of the wires of the connection cable 130 is reduced, the cost of the connection cable 130 may be reduced, and the risk of contact defect between the disconnectably connectable connection cable 130 and the light source driving connector 128 may be reduced due to the reduced number of disconnectably connectable contact pins.

Figure 11:
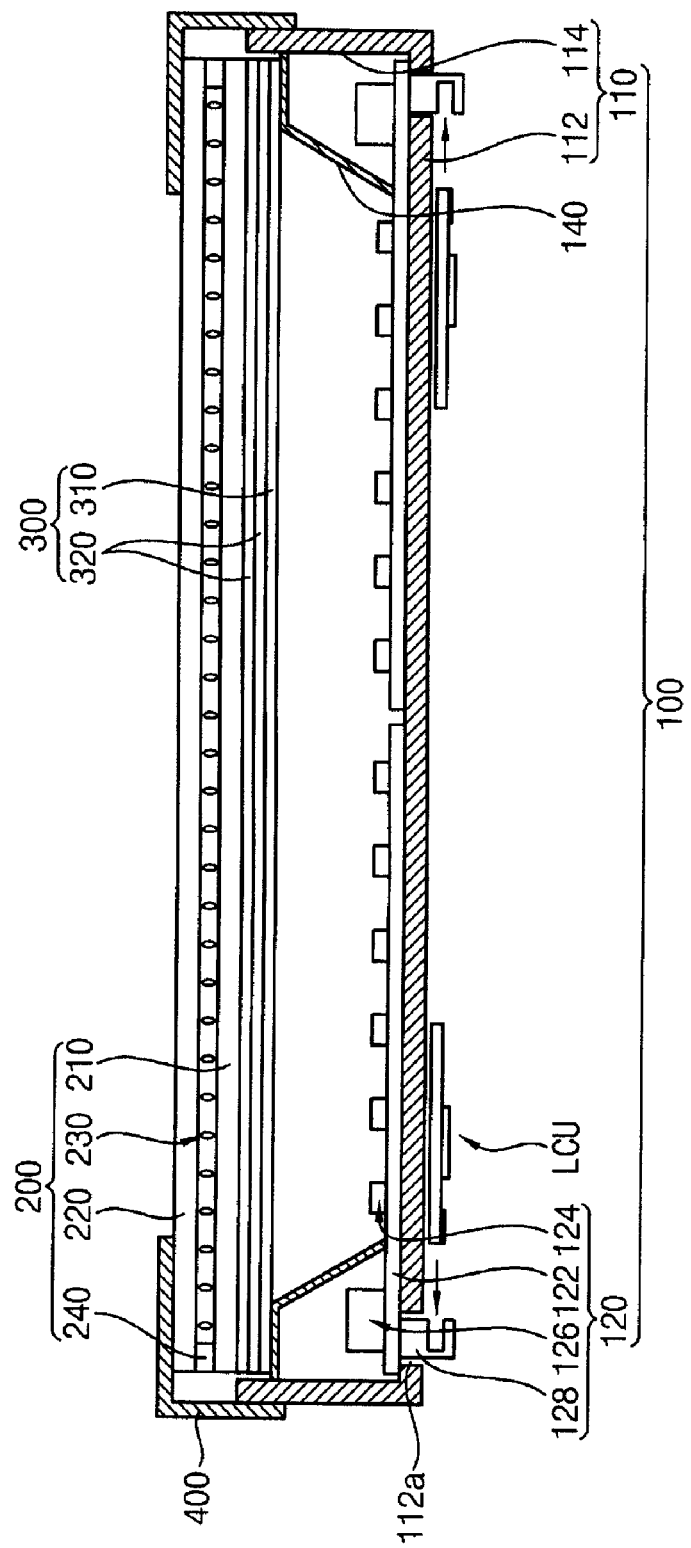
FIG. 11 is a cross-sectional view illustrating a display device in accordance with a fifth embodiment.

FIG. 11 is a cross-sectional view illustrating a display device in accordance with further still other embodiment.

The display device illustrated in FIG. 11 may have substantially the same structure as the display devices described with reference to FIGS. 1 to 3 except that the display device illustrated in FIG. 11 has a light source control unit (LCU) on a sliding substrate that is directly connectable to the light source driving connector without use of an intermediate connection cable. Thus, the same reference numbers are used for the same or similar elements, and any further descriptions concerning the same or similar elements as those described in FIGS. 1 to 3 will be omitted.

Referring to FIG. 11, the light source driving connector 128 is disposed on the second side of the driving substrate 122 facing the bottom plate 112 of the receiving container 110. The light source driving connector 128 may be disposed at an end portion of the second side of the driving substrate 122 corresponding to the currents control element 126.

The bottom plate 112 of the receiving container 110 may have a connector receiving hole 112a for receiving the light source driving connector 128. The light source driving connector 128 protrudes downwardly from the bottom plate 112 through the connector receiving hole 112a. The light source driving connector 128 may include a receiving groove to combine with the light source control unit LCU directly or with a printed circuit substrate that supports the LCU and has an edge connector adapted to mate with the light source driving connector 128. The receiving groove may be formed at the portion protruding down from the bottom plate 112.

The light source control unit LCU may be slidingly inserted into the receiving groove of the light source driving connector 128, and electrically connected to the light source driving connector 128. Here, the light source control unit LCU may include one or more metal patterns formed on a substrate thereof for electrically connecting with the light source driving connector 128.

The number of light source control units (LCU's, two shown) used in the embodiment of FIG. 11 may correspond with the number of the light source modules 120 that are to be controlled. For example, when the number of the light source modules 120 is four, the number of the light source control units LCU may be four. Alternatively, one light source control unit LCU may control two light source modules 120, or one light source control unit LCU may control all four light source modules 120 together.

When one light source control unit LCU controls two or more light source modules 120, for example, one among the light source modules 120 may be electrically connected to the light source control unit LCU, and the others of the light source modules 120 may be internally connected to each other or may be electrically connected to each other via some connecting members.

The foregoing is illustrative of the present disclosure of invention and is not to be construed as limiting thereof. Although a few embodiments have been described, those skilled in the art will readily appreciate from the above that many modifications are possible in the embodiments without materially departing from the novel teachings and advantages of the present disclosure. Accordingly, all such modifications are intended to be included within the spirit and scope of this disclosure. Therefore, it is to be understood that the foregoing is not to be construed as limiting itself to the specific embodiments disclosed, and that modifications to the disclosed embodiments, as well as other embodiments, are intended to be included.

What is claimed is:

1. A light source module, comprising:
a light sources supporting substrate having a light-sourcing first area and a second area outside the first area;
a plurality of light source blocks disposed on the light sources supporting substrate and in the light-sourcing first area thereof, each of the light source blocks including at least one light source;
a currents control element disposed on the light sources supporting substrate and substantially in the second area thereof, the currents control element having a plurality of channel terminals connected for individually controlling a plurality of respective driving currents passing respectively through at least two of said light source blocks, the respective driving currents being for driving and thus causing corresponding light sources of the respective at least two light source blocks to output light, where the plurality of channel terminals are electrically connected to respective ones of the at least two light source blocks; and
a light source driving connector disposed on the light sources supporting substrate and electrically connected to provide control signals via plural wirings to the currents control element, where the provided control signals are for controlling light intensities of the corresponding light sources of the at least two light source blocks and where the number of said plural wirings that respectively provide respective ones of the control signals is less than the number of light sources controlled by the control signals.

2. The light source module of claim 1, wherein the light source driving connector has a predetermined number of disconnectably connectable interconnect terminals for connecting to a supplied interconnect cable that delivers at least the control signals that are used for controlling light intensities of the corresponding light sources.

3. The light source module of claim 2,
wherein each light source block has respective first and second terminals, wherein said interconnect terminals of the light source driving connector include a first connector output terminal electrically connected to the first terminal of each of the at least two light source blocks and a second connector output terminal electrically connected to an input terminal of the currents control element, and
wherein respective ones of the channel terminals of the currents control element are electrically connected to respective second terminals of the at least two light source blocks.

4. The light source module of claim 1 wherein:
the currents control element comprises a monolithic integrated circuit having the plurality of channel terminals.

5. The light source module of claim 1 wherein:
each of the light source blocks includes at least two independently driveable light sources.

6. The light source module of claim 1 wherein:
the light-sourcing first area is a white light sourcing area.

7. The light source module of claim 1 wherein:
the light source driving connector is electrically connected to provide one or more power signals to the light sources of the supporting substrate as well as providing said control signals.

8. A backlight assembly, comprising:
at least one light source module including:
- a driving substrate having a respective backlight-providing first area and a second area outside the first area;
- a plurality of light source blocks disposed on a first side of the driving substrate and in the backlight-providing first area, each of the light source blocks including at least one light source; and
- a currents control element disposed in the second area and having channel terminals connected for individually controlling driving currents passing through at least two light source blocks, the respective driving currents being for driving and thus causing corresponding light sources of the respective at least two light source blocks to output lights of corresponding intensities, the channel terminals being electrically connected to the at least two light source blocks, respectively;
- a light source driving connector disposed on the light sources supporting substrate and electrically connected to provide power and control signals to the supporting substrate including providing the control signals via plural wirings to the currents control element, where the provided control signals are for controlling the light intensities of the corresponding light sources of the at least two light source blocks and where the number of said plural wirings that respectively provide respective ones of the control signals is less than the number of light sources controlled by the control signals; and
- a light source control unit electrically connected by way of the light source driving connector to the light source module, the light source control unit including at least one voltage transforming circuit that transforms a source voltage received from an exterior into a different driving voltage which is transmitted through the light source driving connector and is adapted for driving at least one of the light source blocks.

9. The backlight assembly of claim 8, wherein the light source driving connector is an easily disconnectable from connector that is fixedly connected to the driving substrate, the easily-disconnectable-from light source driving connector mediating in electrically connecting the light source control unit to the light source module.

10. The backlight assembly of claim 9, wherein the light source driving connector includes a connector input terminal electrically connected to the light source control unit, and a connector output terminal electrically connected to the at least two light source blocks and to the currents control element,
wherein the connector output terminal includes:
- a first connector output terminal electrically connected to each first terminal of the light source blocks to output the driving voltage; and
- a second connector output terminal electrically connected to an input terminal of the currents control element to output a control signal for controlling the currents control element, and
wherein the channel terminals of the currents control element are electrically connected to second terminals of the at least two light source blocks, respectively, to individually control the driving currents.

11. The backlight assembly of claim 9, further comprising a receiving container including a bottom plate and a side wall connected to an edge of the bottom plate,
wherein the receiving container receives the light source module and exposes the light source blocks and the currents control element to an exterior.

12. The backlight assembly of claim 11, wherein the light source driving connector is disposed on the first side of the driving substrate.

13. The backlight assembly of claim 12, further comprising a side mold disposed at an end portion of the first side of the driving substrate, the side mold covering the currents control element.

14. The backlight assembly of claim 13, wherein the light source driving connector is disposed at the end portion of the first side of the driving substrate, and the side mold covers the light source driving connector, and
the side wall of the receiving container includes a connector linking hole facing the light source driving connector.

15. The backlight assembly of claim 14, further comprising a disconnectable connection cable electrically connecting the light source control unit to the light source control connector through the connector linking hole.

16. The backlight assembly of claim 11, wherein the light source driving connector is disposed on a second side of the driving substrate facing the bottom plate of the receiving container, and the bottom plate of the receiving container includes a connector receiving hole for receiving the light source driving connector.

17. The backlight assembly of claim 16, further comprising a connection cable electrically connecting the light source control unit to the light source driving connector.

18. The backlight assembly of claim 16, wherein the light source driving connector protrudes downwardly from the bottom plate of the receiving container through the connector receiving hole, and the light source control unit is slidingly inserted into the portion of the light source driving connector protruding downwardly from the bottom plate to be electrically connected to the light source driving connector.

19. The backlight assembly of claim 8, wherein the light source control unit includes:
- a power supply substrate having the voltage transforming circuit and providing the light source module with a corresponding driving voltage as an at least one of the power signals; and
- a control logic substrate providing the light source module with one or more of the control signals for controlling the currents control element.

20. The backlight assembly of claim 8, wherein the voltage transforming circuit includes:
- an inductor having a first terminal and a second terminal, the inductor receiving the source voltage at the first terminal thereof;
- a transistor having an input terminal, an output terminal and a control terminal, the output terminal of the transistor being electrically connected to the second terminal of the inductor;
- a voltage transforming control element electrically connected to each of the input terminal and the control terminal of the transistor;

a diode having a first terminal electrically connected to the second terminal of the inductor and a second terminal through which the driving voltage is outputted; and a capacitor having a first terminal electrically connected to the second terminal of the diode and a second terminal electrically connected to the voltage transforming control element.

21. The backlight assembly of claim 8, wherein each of the light source blocks includes a plurality of light emitting diodes electrically connected to each other in series.

22. The backlight assembly of claim 8, wherein each of the light source blocks includes a plurality of red light emitting diodes electrically connected to each other in series, a plurality of green light emitting diodes electrically connected to each other in series, and a plurality of blue light emitting diodes electrically connected to each other in series.

23. The light source module of claim 8 wherein:
the currents control element comprises a monolithic integrated circuit having the plurality of channel terminals.

24. The light source module of claim 8 wherein:
each of the light source blocks includes at least two independently driveable light sources.

25. The light source module of claim 8 wherein:
the light-sourcing first area is a white light sourcing area.

26. A display device, comprising:
a display panel; and
a backlight assembly disposed under the display panel, the backlight assembly providing the display panel with a light,
wherein the backlight assembly includes:
at least one light source module including:
a driving substrate having a light-sourcing first area and a second area outside the first area;
a plurality of light source blocks disposed on a first side of the driving substrate and in the light-sourcing first area thereof, each of the light source blocks including at least one light source;
a currents control element disposed on the driving substrate and substantially in the second area thereof, the currents control element having channel terminals connected for individually controlling driving currents passing through at least two light source blocks, the respective driving currents being for driving and thus causing corresponding light sources of the respective at least two light source blocks to output light, the channel terminals being electrically connected to the at least two light source blocks, respectively;

a light source driving connector disposed on the driving substrate and electrically connected to provide control signals via plural wirings to the currents control element, where the provided control signals are for controlling light intensities of the corresponding light sources of the at least two light source blocks and where the number of said plural wirings that respectively provide respective ones of the control signals is less than the number of light sources controlled by the control signals; and a light source control unit electrically connected by way of the light source driving connector to the light source module, the light source control unit including at least one voltage transforming circuit that transforms a source voltage applied from an exterior into a driving voltage for driving the light source blocks.

27. The display device of claim 26, wherein the light source control unit includes:
a power supply substrate having the voltage transforming circuit and providing the light source module with the driving voltage; and
a control logic substrate providing the light source module with a control signal for controlling the currents control element.

28. The light source module of claim 26 wherein:
the currents control element comprises a monolithic integrated circuit having the plurality of channel terminals.

29. The light source module of claim 26 wherein:
each of the light source blocks includes at least two independently driveable light sources.

30. The light source module of claim 26 wherein:
the light-sourcing first area is a white light sourcing area.

* * * * *